Patented Dec. 3, 1929

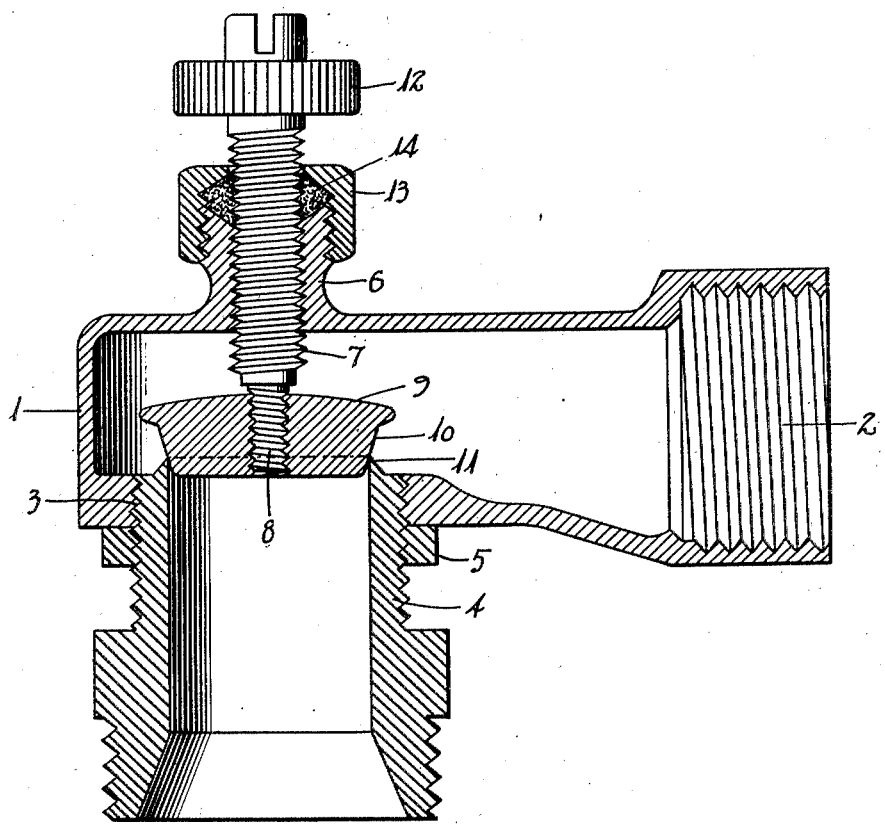

1,738,437

UNITED STATES PATENT OFFICE

JESSE D. LANGDON, OF LOS ANGELES, CALIFORNIA, ASSIGNOR TO LANGDON ENGINEERING CORPORATION, OF LOS ANGELES, CALIFORNIA

VALVE

Application filed December 15, 1927. Serial No. 240,297.

The present invention relates to valves, and aims to provide a novel valve construction which is simple and practical and which comprises a novel assembly of the component elements.

Another object is the provision of a valve having a novel cooperable valve member or head and seat, which provide a tight fit and which have a scraping action to keep the seating surface of the valve member clean.

A further object is the novel assembly of the valve member with the valve stem, and a further object is the provision of novel packing means for said stem.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a median section of the valve, the stem being shown in elevation.

The valve casing or body 1 may be of any suitable size and shape, and is provided with an opening 2 at one end and with an opening 3 at right angles with the opening 2. The opening 3 is screw-threaded to receive a nipple or tubular member 4 which provides the other opening for the casing, as well as a valve seat. A lock nut 5 is preferably threaded on the nipple 4 to bear against the casing 1.

The casing has a boss 6 outstanding therefrom opposite to the opening 3 and nipple 4, and the valve stem 7 is screw threaded through said boss. The inner terminal 8 of the stem is reduced in diameter and screw-threaded reversely, and the valve member or head 9 is threaded on the terminal 8. The valve member has a conical surface 10 to seat against the inner edge of the nipple 4, and the inner end of said nipple is bevelled, as at 11, to present a sharp edge to scrape the tapered surface 10 of the valve member, said edge projecting in a direction opposite to the direction of seating movement of the valve member so as to be presented at an acute angle to the conical or tapered surface of the valve member. The valve member, when seated, wedges into the inner end of the nipple or valve seat, to provide a tight fit, and during the rotary seating movement of the valve member the edge 11 scrapes the surface 10 to keep same clean.

The stem 7 has a handle 12 or other suitable means at its outer end for rotating the stem, and the screw-thread of the terminal 8 being reverse to the main screw thread of the stem will prevent the valve member 9 from accidentally unscrewing from the terminal 8, without using other securing means. It is therefore unnecessary to fasten the valve member on the stem excepting to screw said member on the terminal 8.

A socket nut 13 is threaded on the boss 16 to provide a packing gland, and contains packing 14 that embraces the stem 7 to engage the screw-threads of said stem. The packing is forced into the groove of the screw-thread, when the nut or gland 13 is tightened, and the packing will withstand high pressure of fluid within the valve casing, without the necessity for the nut 13 being abnormally tight, inasmuch as the pressure of the fluid against the packing will tighten the packing against the threads of the stem.

The valve member or head and seat are both of metal, so as to provide a metal to metal contact. The assembly is simple, and when the casing 1 and nipple 4 are separated, the valve member 9 may be readily unscrewed from the stem 7, and the stem then unscrewed from the casing.

Having thus described the invention, what is claimed as new is:—

A valve comprising a casing, a nipple screw-threaded therein and having its inner end bevelled to form a sharp edge, a stem screw-threaded within the casing opposite to said nipple, and a valve member on said stem having a conical surface to seat within said edge with a scraping action, said edge projecting in a direction opposite to the direction of seating movement of said valve member.

In testimony whereof I hereunto affix my signature.

JESSE D. LANGDON.